(12) United States Patent
Sevindik

(10) Patent No.: US 9,706,385 B1
(45) Date of Patent: Jul. 11, 2017

(54) SYSTEMS AND METHODS FOR CONFIGURING DEVICE TO DEVICE COMMUNICATION

(71) Applicant: Sprint Spectrum LP, Overland Park, KS (US)

(72) Inventor: Volkan Sevindik, Fairfax, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 112 days.

(21) Appl. No.: 14/743,008

(22) Filed: Jun. 18, 2015

(51) Int. Cl.
  *H04B 7/00* (2006.01)
  *H04W 8/00* (2009.01)
  *H04W 4/00* (2009.01)
  *H04L 5/00* (2006.01)
  *H04W 8/22* (2009.01)

(52) U.S. Cl.
  CPC ........... *H04W 8/005* (2013.01); *H04L 5/0055* (2013.01); *H04W 4/005* (2013.01); *H04W 8/22* (2013.01)

(58) Field of Classification Search
  CPC . H04W 74/002; H04W 74/08; H04W 74/085; H04W 76/025
  USPC ......................... 370/310, 315, 328, 329, 350
  See application file for complete search history.

(56) References Cited

U.S. PATENT DOCUMENTS

| | | | |
|---|---|---|---|
| 8,934,393 B2 * | 1/2015 | Hakola | H04L 1/1867 370/310 |
| 9,137,790 B2 * | 9/2015 | Chiu | H04W 72/042 |
| 9,241,234 B2 * | 1/2016 | Choi | H04L 1/1829 |
| 9,451,604 B2 * | 9/2016 | Xue | H04L 1/1854 |
| 9,515,800 B2 * | 12/2016 | Lim | H04L 1/1854 |
| 2012/0093098 A1 | 4/2012 | Charbit et al. | |
| 2013/0155962 A1 | 6/2013 | Hakola et al. | |
| 2013/0223356 A1 | 8/2013 | Khoshnevis et al. | |
| 2013/0250843 A1 * | 9/2013 | Zhou | H04L 1/0015 370/312 |
| 2014/0036718 A1 * | 2/2014 | Gao | H04W 72/121 370/254 |
| 2014/0036793 A1 | 2/2014 | Johnsson et al. | |
| 2014/0086175 A1 * | 3/2014 | Hakola | H04W 72/1242 370/329 |

\* cited by examiner

*Primary Examiner* — Dmitry H Levitan

(57) ABSTRACT

Systems and methods are described for configuring device to device communication. Communication information may be received at an access node identifying at least two wireless devices comprising a device to device communication group. NACK messages may be received from a plurality of wireless devices proximate to the communication group. Data may be retransmitted to the plurality of wireless devices proximate to the communication group based on the received NACK messages, wherein the at least two wireless device comprising the communication group perform device to device communication based on the resources used for retransmission.

17 Claims, 9 Drawing Sheets

SYSTEMS AND METHODS FOR CONFIGURING DEVICE TO DEVICE COMMUNICATION

TECHNICAL BACKGROUND

Telecommunication systems, such as cellular networks or other wireless networks, use various network links throughout the network to communicate. While many transmissions occur between a wireless device and an access node, communications between wireless devices may also be leveraged. In certain circumstances, these device to device transmissions may have the potential to interfere with other communication, such as a transmission to or from an access node. Accordingly, a system that effectively mitigates interference issues and considers utilization of system resources may provide an efficient service to users.

OVERVIEW

Systems and methods are described for configuring device to device communication. Communication information may be received at an access node identifying at least two wireless devices comprising a device to device communication group. NACK messages may be received from a plurality of wireless devices proximate to the communication group. Data may be retransmitted to the plurality of wireless devices proximate to the communication group based on the received NACK messages, wherein the at least two wireless device comprising the communication group perform device to device communication based on the resources used for retransmission.

DETAILED DESCRIPTION

In an embodiment, a device to device (D2D) communication group may be implicitly allocated and/or scheduled wireless resources for communication. For example, the D2D communication group may be implicitly allocated and/or scheduled wireless resources for communication, where the wireless resources are also used by an access node to communicate with wireless devices over a signal area. That is, the D2D communication group may be implicitly allocated and/or scheduled non-dedicated wireless resources.

In an embodiment, the wireless resources allocated and/or scheduled to the D2D communication group may comprise resources used during a retransmission of previously received data. For example, the retransmission may comprise a retransmission from the access node to wireless devices that have previously received the data of the retransmission or a retransmission from wireless devices to the access node that has previously received the data of the retransmission. The wireless resources used for such a retransmission may be allocated and/or scheduled to the D2D communication group since any interference caused by the D2D communication group is mitigated because the transmission being interfered with is a transmission of data already received by the intended recipient.

Figure 1:
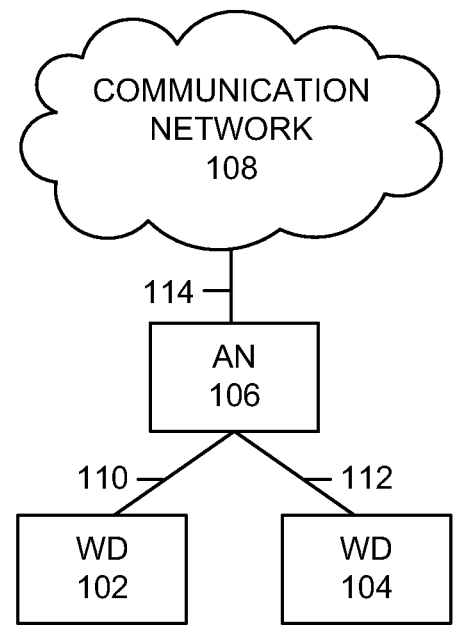
FIG. 1 illustrates an exemplary communication system to configure device to device communication.

FIG. 1 illustrates an exemplary communication system 100 to configure device to device communication comprising wireless devices 102 and 104, access node 106, communication network 108, and communication links 110, 112, and 114. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access node 104 and communication network 108 which are omitted for clarity, including additional processing nodes, routers, gateways, and physical and/or wireless data links for carrying data among the various network elements.

Wireless devices 102 and 104 can be any device configured to communicate over communication system 100 using a wireless communication link. For example, wireless devices 102 and 104 can include a cell phone, a smart phone, a computing platform such as a laptop, palmtop, or a tablet, a personal digital assistant, or an internet access device, and combinations thereof. It is noted that while two wireless devices are illustrated in FIG. 1 as being in communication with access node 106, any number of wireless devices can be implemented.

Access node 106 is a network node capable of providing wireless communications to wireless devices 102 and 104, and can be, for example, a base transceiver station, a radio base station, and an eNodeB device. Access node 106 may communicate with communication network 108 over communication link 114. Although only access node 106 is illustrated in FIG. 1, wireless devices 102 and 104 (and other wireless devices not depicted) can be in communication with a plurality of access nodes and/or small cells. The plurality of access nodes and/or small cells can be associated with different networks and can support different communication protocols and radio access technologies.

Communication network 108 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 108 can be capable of carrying voice information and other information, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 108 may also comprise a wireless network, including base stations, wireless communication nodes, telephony switches, internet routers, network gateways, computer systems, communication links, or some other type of communication equipment, and combinations thereof.

Communication links 110, 112, and 114 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, GSM, CDMA, UMTS, HSPA, EV-DO, or 3GPP LTE, or combinations thereof. Other wireless protocols can also be used.

Figure 2:
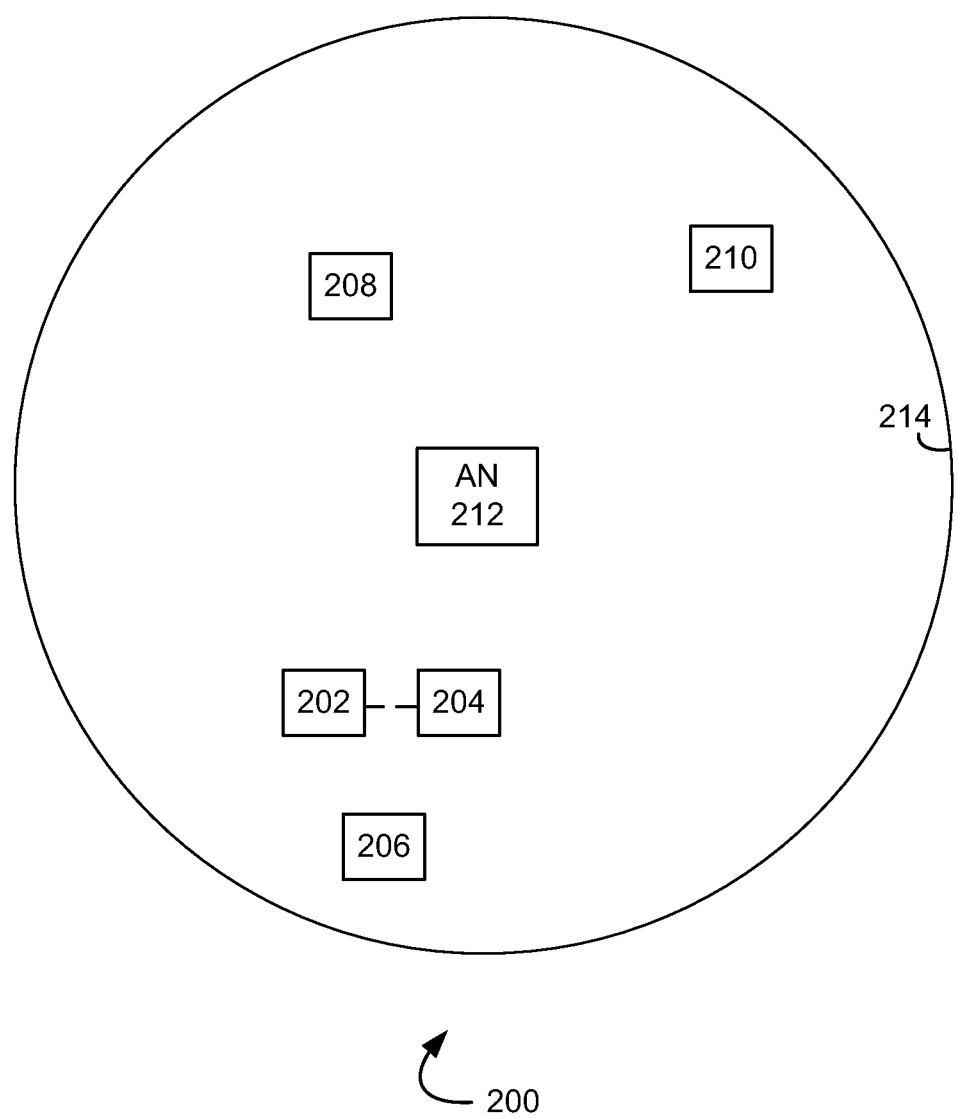
FIG. 2 illustrates another exemplary communication system to configure device to device communication.

FIG. 2 illustrates an exemplary communication system 200 for configuring device to device communication. System 200 comprises wireless devices 202, 204, 206, 208, and 210, access node 212, and signal area 214. Wireless devices 202, 204, 206, 208, and 210 may comprise wireless devices similar to wireless device 102 and access node 212 may comprise an access node similar to access node 106.

In an embodiment, system 200 may use a plurality of carriers in order to provide wireless communication services. A plurality of carriers that comprise bandwidth for wireless communications (e.g., 2.5 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers.

In an embodiment, a signal area may comprise an area around an access node where a wireless device may detect wireless signals transmitted from the access node (e.g., a references signal) at a signal level above a threshold. In this example, access node 212 may comprise signal area 214 such that the access node may transmit signals over the signal area using one or more particular band classes (BCs). A band class may comprise a block of wireless spectrum. In an embodiment, a frequency band may comprise a band class. Examples of such band classes may be blocks of spectrum at 800 MHz, 1,900 MHz, and 2,500 MHz In operation, access node 212 may establish communication with wireless devices 202, 204, 206, 208, and 210 such that access node 212 provides the wireless device access to a communication network (e.g., communication network 106). Access node 212 may schedule transmissions (e.g., physical resource block transmissions) to wireless devices in communication with the access node. For example, a packet may be received at access node 212 that is associated with wireless device 202, and access node 212 may schedule transmissions to wireless device 202 to communicate the data from the received packet.

In an embodiment, wireless devices may use device to device (D2D) communication in order to communicate data between the devices (e.g., without using the access node). For example, wireless devices 202 and 204 may comprise a D2D communication group such that the wireless devices communicate data. In an embodiment, the D2D communication group may communicate using wireless resources also used by access node 212 when communicating with wireless devices over signal area 214. For example, wireless devices 202 and 204 may communicate using a first frequency band, where at least one of the wireless devices transmits data over the first frequency band. In this example, access node 212 may also transmit signals over the first frequency band when communicating with wireless devices within signal area 214. Accordingly, a system that effectively configures device to device communication may reduce interference and enhance wireless services across the system.

Figure 3:
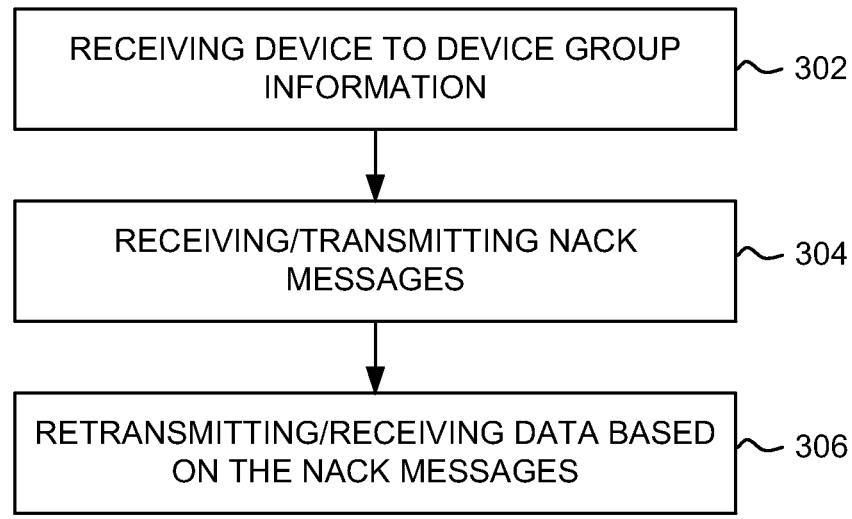
FIG. 3 illustrates an exemplary method for configuring device to device communication.

FIG. 3 illustrates an exemplary method for configuring device to device communication. The method will be discussed with reference to the exemplary communication system 200 illustrated in FIG. 2, however, the method can be implemented with any suitable communication system.

Referring to FIG. 3, at step 302, device to device communication group information may be received at an access node identifying at least two wireless devices comprising a device to device communication group. For example, data may be received at access node 212 identifying wireless device 202 and 204 as comprising a D2D communication group.

At step 304, NACK message may be received from a plurality of wireless devices proximate to the communication group. For example, a NACK message may comprise an indication that a transmission has not been received. In an embodiment, access node 212 may transmit data to wireless device 206 (e.g., a wireless device proximate to the D2D communication group). Wireless device 206 may transmit a NACK message associated with the transmission from access node 212. In an embodiment, wireless device 206 may transmit a NACK message based on the transmission from access node 212 when the wireless device successfully received the data transmitted.

At step 306, data may be retransmitted to the plurality of wireless devices proximate to the communication group based on the received NACK messages, wherein the at least two wireless device comprising the communication group perform device to device communication based on the resources used for retransmission. For example, access node 212 may retransmit data to wireless device 206 (e.g., a wireless device proximate to the D2D communication group) based on the NACK message received from wireless device 206. During the retransmission from access node 212, the D2D communication group may communicate data (e.g., one of wireless devices 202 and 204 may transmit data to the other). In this example, the D2D communication group may communicate data even though access node 212 is also transmitting data since the data transmitted by access node 212 comprises retransmission data to wireless devices that already successfully received the data of the retransmission (e.g., wireless device 206). In an embodiment, wireless devices 202 and 204 communicate over a frequency band used by access node 212 when communicating with wireless devices over signal area 214.

Figure 4:
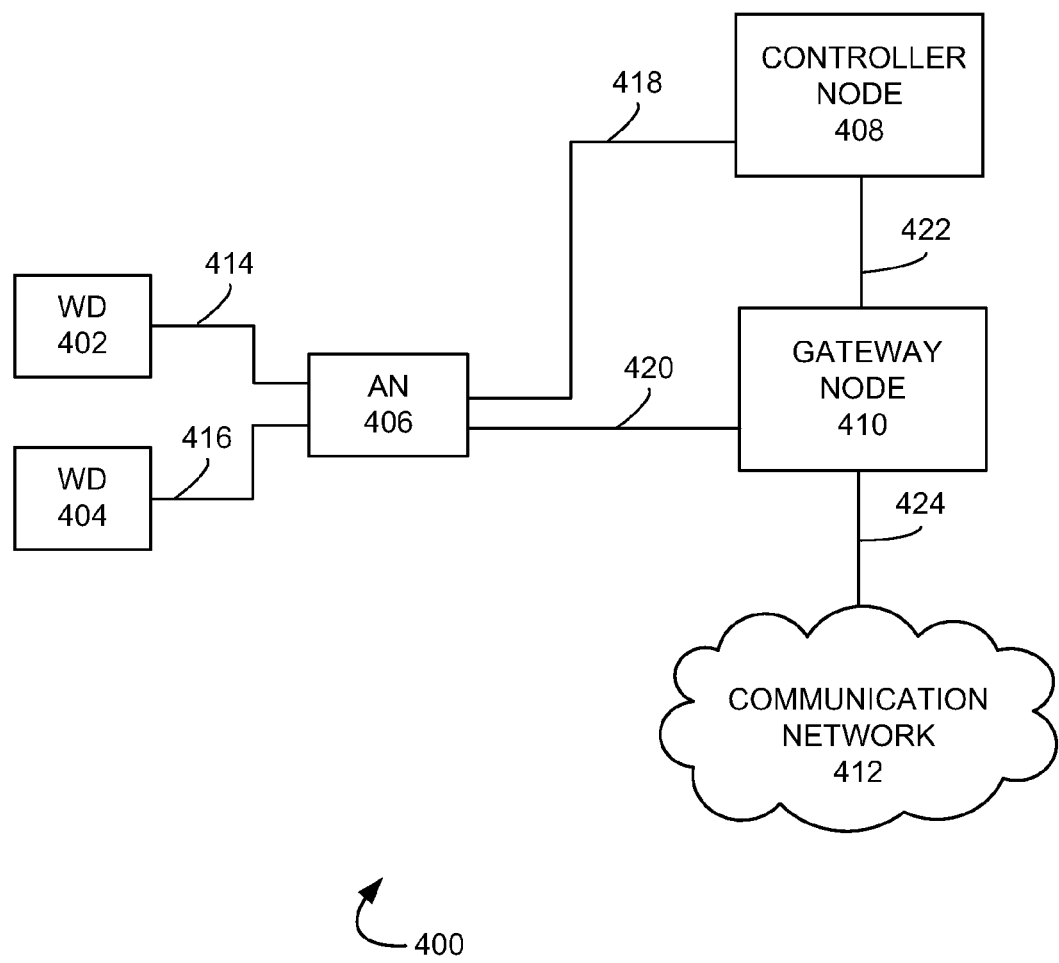
FIG. 4 illustrates another exemplary system to configure device to device communication.

FIG. 4 illustrates another exemplary communication system 400 for configuring device to device communication. Communication system 400 may comprise wireless devices 402 and 404, access node 406, controller node 408, gateway node 410, communication network 412, and communication links 416, 418, 420, 422, and 424. Other network elements may be present in the communication system 400 to facilitate communication but are omitted for clarity, such as base stations, base station controllers, gateways, mobile switching centers, dispatch application processors, and location registers such as a home location register or visitor location register.

Wireless devices 402 and 404 can be any devices configured to communicate over communication system 400 using a wireless communication link. For example, wireless devices 402 and 404 can include a cell phone, a smart phone, a computing platform such as a laptop, palmtop, or a tablet, a personal digital assistant, or an internet access device, and combinations thereof.

Access node 406 is a network node capable of providing wireless communications to wireless devices 402 and 404, and can be, for example, a base transceiver station, a radio base station, or an eNodeB device. In an embodiment, access node 406 can comprise a serving access node for wireless devices 402 and 404. Access node 406 may communicate with controller node 408 over communication link 418 and with gateway node 410 over communication links 420.

Controller node 408 can be any network node configured to manage services within system 400. Controller node 408 may provide other control and management functions for system 400. The controller node 408 can be a single device having various functions or a plurality of devices having differing functions. For example, controller node 408 can include at least one of a multi-cell/multicast coordination entity (MCE), a mobility management entity (MME), a mobile switching center (MSC), a radio network controller (RNC), and a combination thereof.

Controller node 408 can comprise a processor and associated circuitry to execute or direct the execution of computer-readable instructions to obtain information. Controller node 408 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Controller node 408 can receive instructions and other input at a user interface. Controller node 408 can comprise a processor and associated circuitry to execute or direct the execution of computer-readable instructions to obtain information.

Gateway node 410 is a network element which can comprise a processor and associated circuitry to execute or direct the execution of computer-readable instructions. Gateway node 410 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway node 410 can provide instructions to access node 406 related to channel selection in communications with wireless devices 402 and 404. For example, gateway node 410 can comprise at least one of a serving gateway (SGW), a packet data network gateway (PDNGW), a cellular gateway (CGW), and a combination thereof.

Communication network 412 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 412 may also comprise base stations, wireless communication nodes, telephony switches, internet routers, network gateways, computer systems, communication links, or some other type of communication equipment, and combinations thereof. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 412 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 416, 418, 420, 422, and 424 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), or Long Term Evolution (LTE), or combinations thereof. Other wireless protocols can also be used.

Other network elements may be present in the communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access node 406, controller node 408, gateway node 410, and communication network 412 which are omitted for clarity, including additional processing nodes, routers, gateways, and physical and/or wireless data links for carrying data among the various network elements. In an embodiment, any of controller node 408, gateway node 410, and one or more modules of access node 406 may perform all or parts of the methods of FIGS. 3, 6 and 7.

Figure 5:
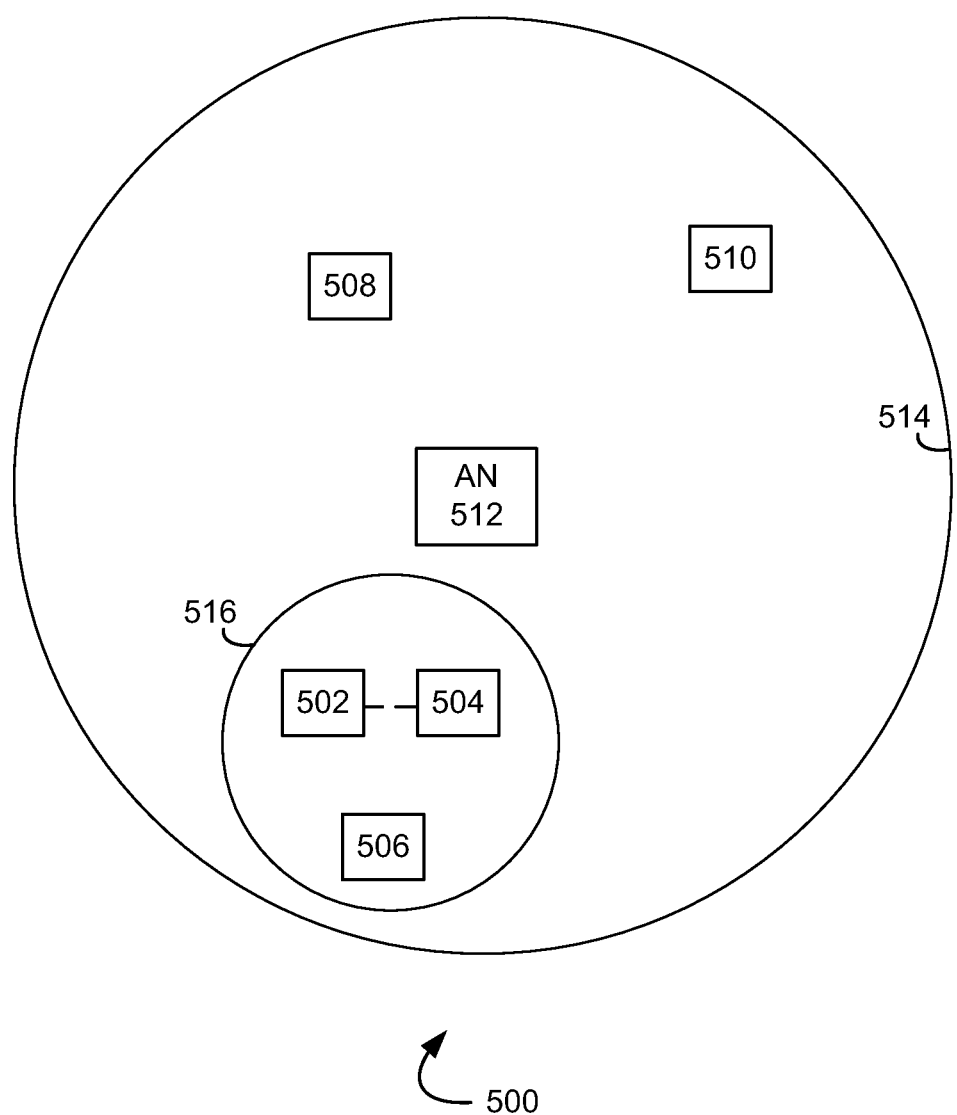
FIG. 5 illustrates another exemplary system to configure device to device communication.

FIG. 5 illustrates an exemplary communication system 500 for configuring device to device communication. System 500 comprises wireless devices 502, 504, 506, 508, and 510, access node 512, signal area 514, and area 516. Wireless devices 502, 504, 506, 508, and 510 may comprise wireless devices similar to wireless device 402 and access node 512 may comprise an access node similar to access node 406.

In an embodiment, system 500 may use a plurality of carriers in order to provide wireless communication services. A plurality of carriers that comprise bandwidth for wireless communications (e.g., 2.5 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers.

In an embodiment, a signal area may comprise an area around an access node where a wireless device may detect wireless signals transmitted from the access node (e.g., a references signal) at a signal level above a threshold. In this example, access node 512 may comprise signal area 514 such that the access node may transmit signals over the signal area using one or more particular band classes (BCs). A band class may comprise a block of wireless spectrum. In an embodiment, a frequency band may comprise a band class. Examples of such band classes may be blocks of spectrum at 800 MHz, 1,900 MHz, and 2,500 MHz In operation, access node 512 may establish communication with wireless devices 502, 504, 506, 508, and 510 such that access node 512 provides the wireless device access to a communication network (e.g., communication network 412). Access node 512 may schedule transmissions (e.g., physical resource block transmissions) to wireless devices in communication with the access node. For example, a packet may be received at access node 512 that is associated with wireless device 502, and access node 512 may schedule transmissions to wireless device 502 to communicate the data from the received packet.

In an embodiment, wireless devices may use device to device (D2D) communication in order to communicate data between the devices (e.g., without using the access node). For example, wireless devices 502 and 504 may comprise a D2D communication group such that the wireless devices communicate data. In an embodiment, the D2D communication group may communicate using wireless resources also used by access node 512 when communicating with wireless devices over signal area 514. For example, wireless devices 502 and 504 may communicate using a first frequency band, where at least one of the wireless devices transmits data over the first frequency band. In this example, access node 512 may also transmit signals over the first frequency band when communicating with wireless devices within signal area 514. Accordingly, a system that effectively configures device to device communication may reduce interference and enhance wireless services across the system.

Figure 6:
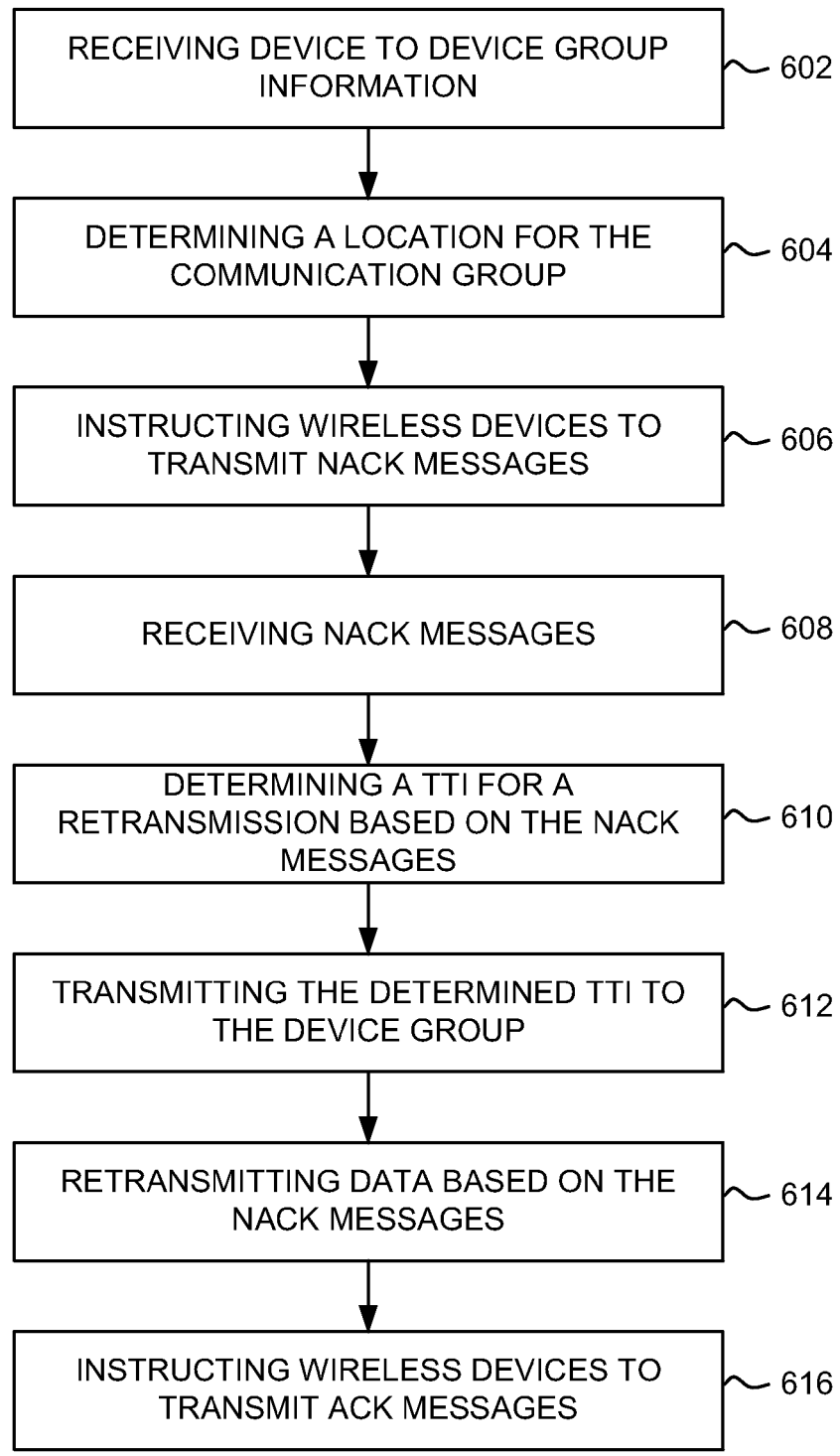
FIG. 6 illustrates an exemplary method for configuring device to device communication.

FIG. 6 illustrates an exemplary method for configuring device to device communication. The method will be discussed with reference to the exemplary communication system 500 illustrated in FIG. 5, however, the method can be implemented with any suitable communication system.

Referring to FIG. 6, at step 602, device to device (D2D) communication group information may be received at an access node identifying at least two wireless devices comprising a device to device communication group. For example, data may be received at access node 512 identifying wireless devices 502 and 504 as comprising a D2D communication group.

In an embodiment, a D2D communication group may communicate data over one or more frequency bands using a communication protocol similar to the protocol used by access node 512. One of wireless device 502 and 504 may transmit data to the other wireless device using an antenna. Wireless devices 502 and 504 may communicate data using wireless resources that are used by access node 512 when communicating with wireless devices over signal area 514. In this example, the wireless resources used by the D2D communication group are shared with access node 512, and thus do not comprise dedicated wireless resources. In an embodiment, the wireless devices 502 and 504 may communicate using wireless resources that access node 512 uses to transmit downlink communications. The D2D communication group may comprise a plurality of wireless devices (e.g., greater than two).

At step 604, a location may be determined for the D2D communication group. For example, a location may be determined for the D2D communication group comprising wireless devices 502 and 504. A location may be determined based on a global positioning system (GPS), signal triangulation (e.g., using signal levels received at a wireless device from a plurality of access points), an access node sector for the group, a channel quality indicator for the group, a timing advanced used for data transmission from the access node to the group, and any other suitable technique. In an embodiment, a location for one or a plurality of the wireless devices comprising the D2D communication group may be determined, and the location for the wireless device may be used as the location for the group.

At step 606, wireless devices proximate to the D2D communication group may be instructed to transmit NACK messages based on successfully received data. For example, a NACK message may comprise an indication that a transmission has not been received successfully. In an embodiment, access node 512 may transmit data to wireless device 506 (e.g., a wireless device proximate to the D2D communication group). Access node 512 may instruct wireless device 506 to transmit a NACK message even when a transmission has been successfully received.

In an embodiment, a NACK message may be implemented with an Automatic Repeat Request (ARQ) protocol or a Hybrid Automatic Repeat Request (HARQ) protocol. For example, access node 512 may implement a HARQ protocol such that a NACK message from a wireless device indicates data that was not successfully received at the wireless device. Based on the HARQ protocol, access node 512 may retransmit the data associated with the NACK message so that it may be successfully received by the wireless device.

In an embodiment, access node 512 may instruct wireless devices proximate to the D2D communication group to transmit the NACK messages. For example, area 516 may comprise an area around the D2D communication group where wireless devices within the area are proximate to the group. Here, wireless device 506 may be proximate to the communication group. Area 516 may be bounded by a threshold distance from the D2D communication group. In an embodiment, wireless devices may be determined to be proximate to the D2D communication group based on a sector of the access node and/or a CQI for the wireless devices. For example, where a wireless device is located within the same sector as the D2D communication group and comprises a CQI that is substantially similar to the CQI for the D2D communication group (e.g., at least one wireless device comprising the D2D communication group), the wireless device may be determined to be proximate to the communication group. In an example, two CQI's that comprise a difference that is within a predetermined threshold may comprise substantially similar CQIs. Wireless devices may be determined to be proximate to the communication group in any other suitable manner.

In an embodiment, the wireless devices may be instructed to transmit NACK messages during one or more particular transmission time intervals (TTIs) of a transmission frame. For example, a frame structure may comprise a number of subframes (e.g. Transmission Time Intervals, TTIs) that include a mix of uplink subframes and downlink subframes. In some embodiments, a special subframe may also be used, for instance, as a guard between an uplink subframe and a downlink subframe or for any other suitable purpose. When using a time division duplexing (TDD) protocol, an uplink subframe and a downlink subframe may be transmitted over the same frequency but at different times. When using a frequency division duplexing (FDD) protocol, an uplink subframe and a downlink subframe may be transmitted over the same transmission time interval (TTI) but at different frequencies.

Figure 8:
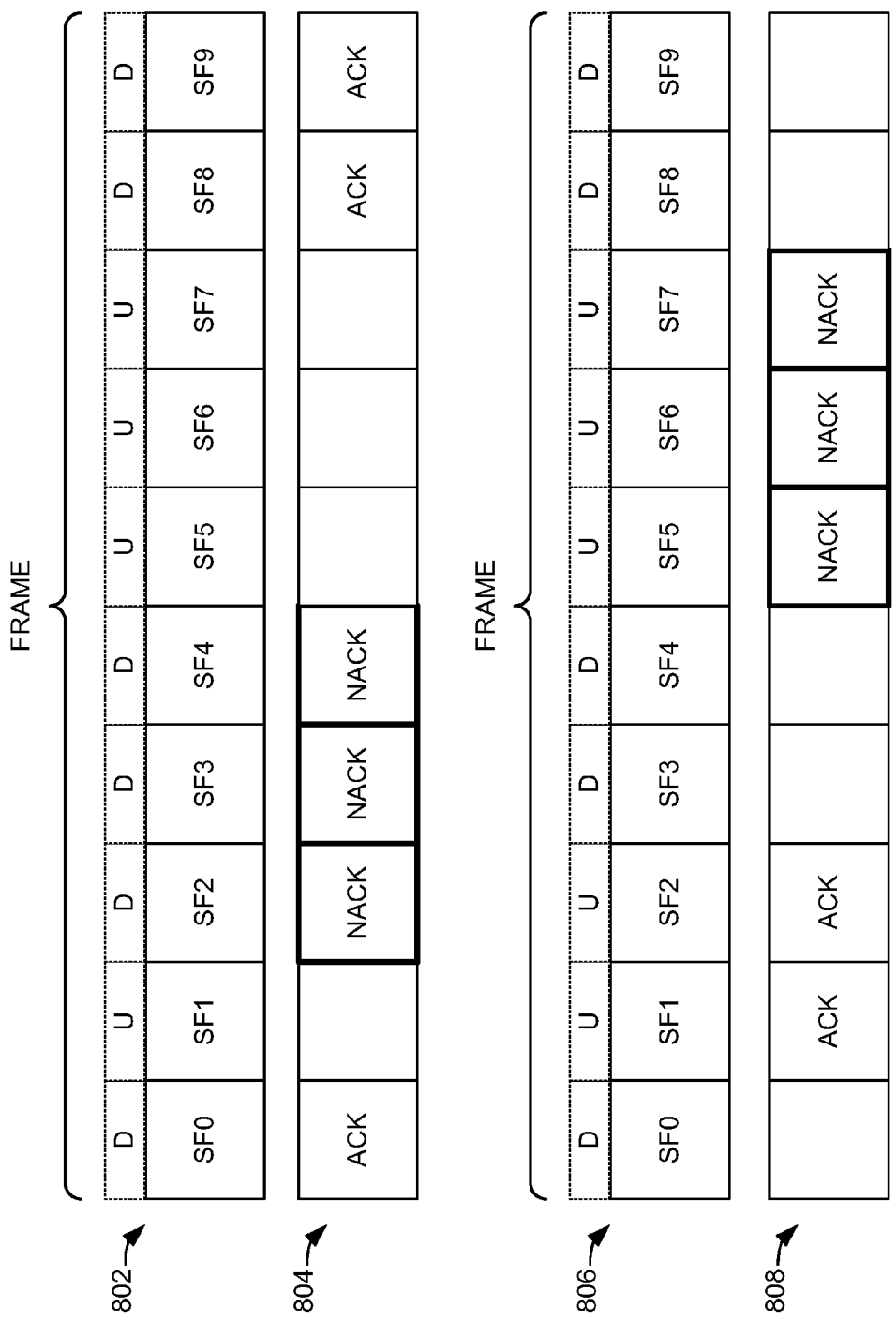
FIG. 8 illustrates an exemplary frame structure for configuring device to device communication.

FIG. 8 may illustrate a frame structure used for configuring a device to device communication. Frame structure 802 may indicate a frame structure used by access node 512 and wireless devices for communication. In an embodiment, downlink subframes may be used to implicitly schedule resources for the D2D communication group. Here, the third, fourth, and fifth subframes may comprise a block of three downlink subframes. Access node 512 may instruct wireless devices to transmit NACK messages corresponding to transmissions during the TTIs for the third, fourth, and fifth subframes, even when the data was successfully received at the wireless devices.

Accordingly, 804 may illustrate the acknowledgements transmitted from a wireless devices based on transmissions from access node 512, where the wireless device has been instructed to transmit NACK messages for particular TTIs even when data was successfully received. The wireless device may transmit an acknowledgement that data was successfully received (ACK) for the data transmitted during the first subframe. The second subframe may comprise an uplink subframe, and thus neither an ACK nor NACK message may be transmitted from the wireless device for this subframe. The wireless devices may then transmit NACK messages for the data transmitted during the third, fourth, and fifth subframes, even though the data was successfully received at the wireless device. Thus, the data that will be retransmitted based on these NACK messages may be implicitly allocated to the D2D communication group since access node 512 will be retransmitting data that has already been successfully received at the wireless device.

At step 608, NACK message may be received from a plurality of wireless devices proximate to the communication group. For example, wireless device 506 may transmit a NACK message based on the transmission from access node 512 when the wireless device successfully received the data transmitted. Here, the HARQ protocol implemented by access node 512 may be leveraged such that a retransmission that comprises data already successfully received at wireless device 506 may be triggered. During the retransmission, resources may be implicitly scheduled for the D2D communication group. In an embodiment, the NACK messages may be received for data transmissions during particular TTIs, where the wireless devices transmitting the NACK messages were instructed to transmit the messages corresponding to the particular TTIs even when data was successfully received at the wireless devices.

At step 610, a transmission time interval (TTI) for a retransmission from access node 512 based on the received NACK messages may be determined. For example, NACK messages may be received for data transmissions corresponding to particular TTIs, where the wireless devices transmitting the NACK messages were instructed to transmit the messages corresponding to the particular TTIs even when data was successfully received at the wireless device. In an embodiment, TTIs for the retransmission triggered by the received NACK messages may be determined. The corresponding TTIs may be determined based on the particular HARQ protocol implemented.

At step 612, the determined TTIs are transmitted to the D2D communication group. For example, access node 512 may transmit the TTIs determined for the retransmissions triggered by the received NACK messages to the D2D communication group comprising wireless devices 502 and 504. Accordingly, the D2D communication group is implicitly scheduled to use the wireless resources corresponding to the transmitted TTIs since access node 512 will be retransmitting data previously received by wireless devices proximate to the communication group during the TTIs.

At step 614, data may be retransmitted to the plurality of wireless devices proximate to the communication group based on the received NACK messages, wherein the at least two wireless devices comprising the communication group perform device to device communication based on the resources used for retransmission. For example, access node 512 may retransmit data to wireless device 506 (e.g., a wireless device proximate to the D2D communication group) based on the NACK message received from wireless device 506. During the retransmission from access node 512, the D2D communication group may communicate data (e.g., one of wireless devices 502 and 504 may transmit data to the other). In an embodiment, wireless devices 502 and 504 may communicate during the subframes transmitted to the D2D communication group for the retransmission. In this example, the D2D communication group may communicate data while access node 512 is also transmitting data since the data transmitted by access node 512 comprises retransmission data to wireless devices that already successfully received the data comprising the retransmission (e.g., wireless device 506). In an embodiment, wireless devices 502 and 504 communicate over a frequency band used by access node 512 when communicating with wireless devices over signal area 514.

At step 616, wireless devices proximate to the D2D communication group may be instructed to transmit ACK messages for the retransmissions. For example, the wireless devices instructed to transmit NACK messages for successfully received data (e.g., wireless device 506) may be instructed to transmit ACK messages for the retransmission data, even when the retransmissions were not successfully received. Since the retransmission data has already been successfully received at the wireless devices, an additional retransmission should not be triggered by additional NACK messages.

Figure 7:
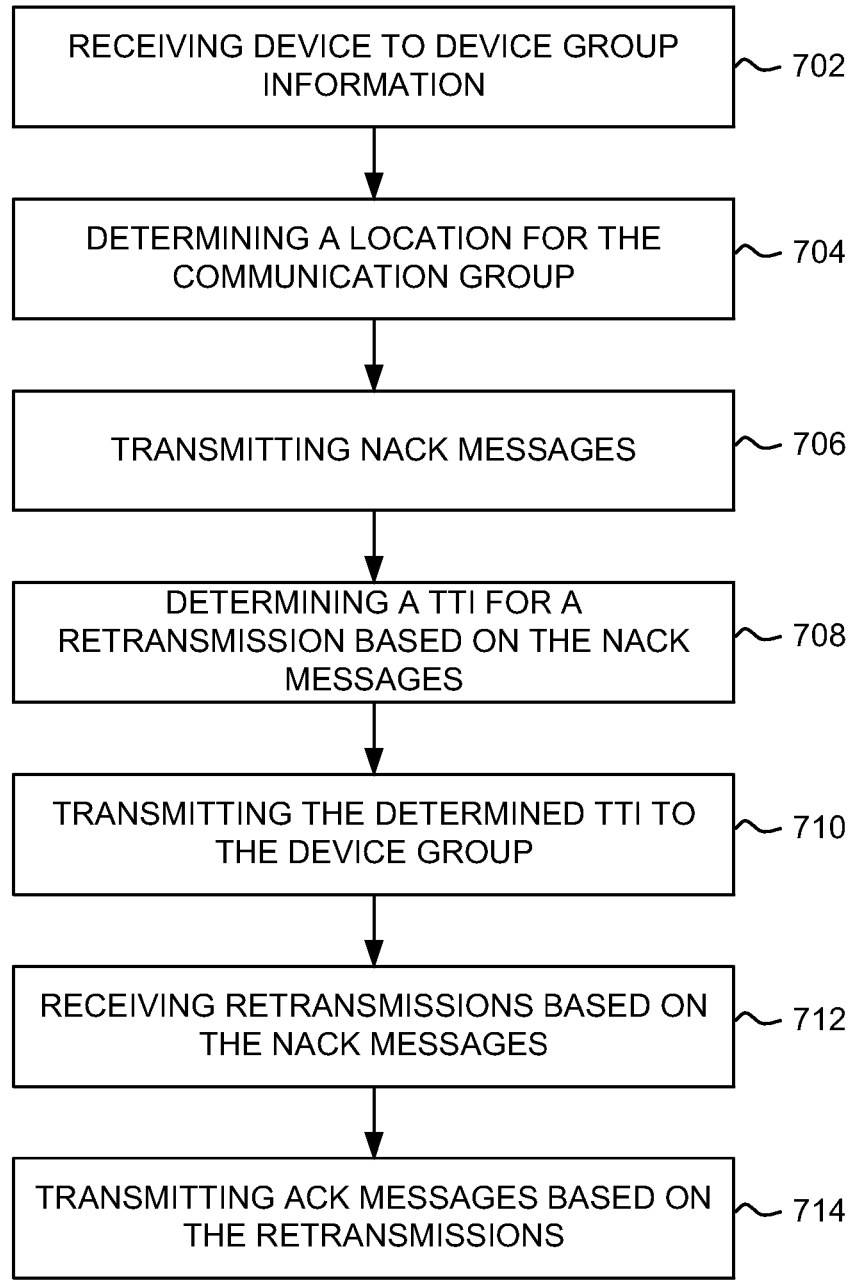
FIG. 7 illustrates an exemplary method for configuring device to device communication.

FIG. 7 illustrates an exemplary method for configuring device to device communication. The method will be discussed with reference to the exemplary communication system 500 illustrated in FIG. 5, however, the method can be implemented with any suitable communication system.

Referring to FIG. 7, at step 702, device to device (D2D) communication group information may be received at an access node identifying at least two wireless devices comprising a device to device communication group. For example, data may be received at access node 512 identifying wireless device 502 and 504 as comprising a D2D communication group.

In an embodiment, a D2D communication group may communicate data over one or more frequency bands using a communication protocol similar to the protocol used by access node 512. One of wireless device 502 and 504 may transmit data to the other wireless device using an antenna. Wireless devices 502 and 504 may communicate data using wireless resources that are used by access node 512 when communicating with wireless devices over signal area 514. In this example, the wireless resources used by the D2D communication group are shared with access node 512, and thus do not comprise dedicated wireless resources. In an embodiment, the wireless devices 502 and 504 may communicate using wireless resources that wireless devices use to transmit uplink transmissions to access node 512. The D2D communication group may comprise a plurality of wireless devices (e.g., greater than two).

At step 704, a location may be determined for the D2D communication group. For example, a location may be determined for the D2D communication group comprising wireless devices 502 and 504. A location may be determined based on a global positioning system (GPS), signal triangulation (e.g., using signal levels received at a wireless device from a plurality of access points), an access node sector for the group, a channel quality indicator for the group, a timing advanced used for data transmission from the access node to the group, and any other suitable technique. In an embodiment, a location for one or a plurality of the wireless devices comprising the D2D communication group may be determined, and the location for the wireless devices may be used as the location for the group.

At step 706, the access node may transmit NACK messages to wireless devices proximate to the D2D communication group based on successfully received data. For example, wireless device 506 (e.g., a wireless device proximate to the D2D communication group) may transmit data to access node 512. In an embodiment, access node 512 may transmit NACK messages to the wireless devices proximate to the D2D communication group that transmit data to the access node (e.g., wireless device 506).

For example, area 516 may comprise an area around the D2D communication group where wireless devices within the area are proximate to the group. Here, wireless device 506 may be proximate to the communication group. Area 516 may be bounded by a threshold distance from the D2D communication group. In an embodiment, wireless devices may be determined to be proximate to the D2D communication group based on a sector of the access node and/or a CQI for the wireless devices. For example, where a wireless device is located within the same sector as the D2D communication group and comprises a CQI that is substantially similar to the CQI for the D2D communication group (e.g., at least one wireless device comprising the D2D communication group), the wireless device may be determined to be proximate to the communication group. In an example, two CQI's that comprise a difference that is within a predetermined threshold may comprise substantially similar CQIs. Wireless devices may be determined to be proximate to the communication group in any other suitable manner.

In an embodiment, access node 512 may transmit NACK messages during one or more particular transmission time intervals (TTIs) of a transmission frame. For example, a frame structure may comprise a number of subframes (e.g. Transmission Time Intervals, TTIs) that include a mix of uplink subframes and downlink subframes. In some embodiments, a special subframe may also be used, for instance, as a guard between an uplink subframe and a downlink subframe or for any other suitable purpose.

FIG. 8 may illustrate a frame structure used for configuring a device to device communication. Frame structure 806 may indicate a frame structure used by access node 512 and wireless devices for communication. In an embodiment, uplink subframes may be used to implicitly schedule resources for the D2D communication group. Here, the sixth, seventh, and eighth subframes may comprise a block of three uplink subframes. Access node 512 may transmit NACK messages corresponding to transmissions during the TTIs for the sixth, seventh, and eighth subframes, even when the data was successfully received at the access node.

Accordingly, 808 may illustrates the acknowledgements transmitted from access node 512 based on transmissions from wireless devices, where access node 512 may transmit NACK messages for particular TTIs even when data was successfully received. The first, fourth, and fifth subframes may comprise a downlink subframes, and thus neither an ACK nor NACK message may be transmitted from the access node for these subframes. Access node 512 may transmit an acknowledgement that data was successfully received (ACK) for the data transmitted during the second and third subframes. Access node 512 may then transmit NACK messages for the data transmitted during the sixth, seventh, and eighth subframes, even though the data was successfully received at the access node. Thus, the data that will be retransmitted based on these NACK messages may be implicitly allocated to the D2D communication group since wireless devices will be retransmitting data that has already been successfully received at the access node.

In an embodiment, NACK messages may also be transmitted to the wireless devices comprising the D2D communication group (e.g., wireless devices 502 and 504). Accordingly, the wireless devices may be instructed that the wireless resources used for the retransmissions triggered by the NACK messages may be used for D2D communication.

At step 708, a transmission time interval (TTI) for a retransmission from the wireless devices based on the received NACK messages may be determined. For example, NACK messages may be transmitted for data transmissions corresponding to particular TTIs. In an embodiment, TTIs for the retransmission triggered by the received NACK messages may be determined. The corresponding TTIs may be determined based on the particular HARQ protocol implemented.

In an embodiment, the TTIs for the retransmission may be determined at each wireless device that received the NACK messages. In another embodiment, access node 512 may determine the TTIs for the retransmissions.

At step 710, the determined TTIs are transmitted to the D2D communication group. For example, access node 512 may transmit the TTIs determined for the retransmissions triggered by the NACK messages to the D2D communication group comprising wireless devices 502 and 504. Accordingly, the D2D communication group is implicitly scheduled to use the wireless resources corresponding to the transmitted TTIs since wireless devices proximate to the D2D communication group will be retransmitting data previously received by the access node during the TTIs. In an embodiment, the wireless devices comprising the D2D communication group may determine the TTIs for the retransmission themselves, and thus access node 512 may not send the communication group the determined TTIs since each of the wireless devices has already determined the TTIs.

At step 712, data may be retransmitted to the access node from the plurality of wireless devices proximate to the communication group based on the received NACK messages, wherein the at least two wireless devices comprising the communication group perform device to device communication based on the resources used for retransmission. For example, access node 512 may receive retransmissions from wireless devices proximate to the D2D communication group (e.g., wireless device 506) based on the transmitted NACK messages. During the retransmission from the wireless devices, the D2D communication group may communicate data (e.g., one of wireless devices 502 and 504 may transmit data to the other). In an embodiment, wireless devices 502 and 504 may communicate during the subframes transmitted to the D2D communication group for the retransmission or subframes determined by the D2D communication group for the retransmissions. In this example, the D2D communication group may communicate data while wireless devices proximate to the D2D communication group are also transmitting data since the data transmitted comprises retransmission data that has already been successfully received by the access node. In an embodiment, wireless devices 502 and 504 communicate over a frequency band used by access node 512 when communicating with wireless devices over signal area 514.

In an embodiment, a D2D communication group may be implicitly allocated and/or scheduled wireless resources for communication. For example, the D2D communication group comprising wireless devices 502 and 504 may be implicitly allocated and/or scheduled wireless resources for communication, where the wireless resources are also used by access node 512 to communicate with wireless devices over signal area 514. That is, the D2D communication group may be implicitly allocated and/or scheduled non-dedicated wireless resources.

In an embodiment, the wireless resources allocated and/or scheduled to the D2D communication group may comprise resources used during a retransmission of previously received data. For example, the retransmission may comprise a retransmission from the access node to wireless devices that have previously received the data of the retransmission or a retransmission from wireless devices to the access node that has previously received the data of the retransmission. The wireless resources used for such a retransmission may be allocated and/or scheduled to the D2D communication group since any interference caused by the D2D communication group is mitigated because the transmission being interfered with is the transmission of data already received by the intended recipient.

At step 714, the access node may transmit ACK messages for the retransmissions. For example, access node 512 may transmit ACK messages for the retransmission data, even when the retransmissions were not successfully received. Since the retransmission data has already been successfully received at the access node, an additional retransmission should not be triggered by additional NACK messages.

Although the methods described perform steps in a particular order for purposes of illustration, the methods discussed herein are not limited to any particular order or arrangement. One skilled in the art, using the disclosure provided herein, will appreciate that various steps of the methods can be omitted, rearranged, combined, and/or adapted in various ways.

Figure 9:
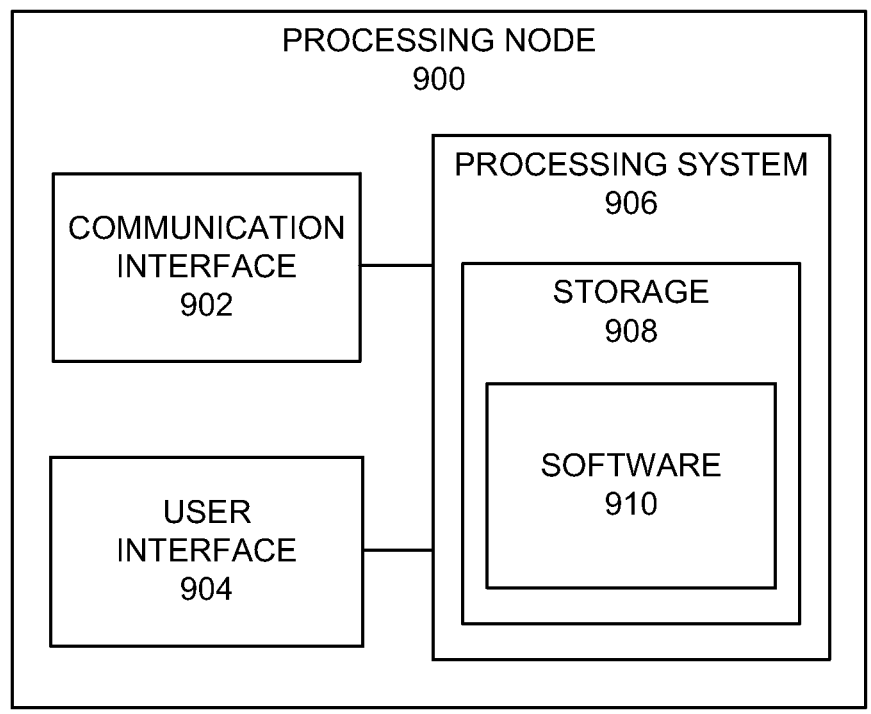
FIG. 9 illustrates an exemplary processing node.

FIG. 9 illustrates an exemplary processing node 900 in a communication system. Processing node 900 comprises communication interface 902, user interface 904, and processing system 906 in communication with communication interface 902 and user interface 904. Processing node 900 can be configured to determine a communication access node for a wireless device. Processing system 906 includes storage 908, which can comprise a disk drive, flash drive, memory circuitry, or other memory device. Storage 908 can store software 910 which is used in the operation of the processing node 900. Storage 908 may include a disk drive, flash drive, data storage circuitry, or some other memory apparatus. Software 910 may include computer programs, firmware, or some other form of machine-readable instructions, including an operating system, utilities, drivers, network interfaces, applications, or some other type of software. Processing system 906 may include a microprocessor and other circuitry to retrieve and execute software 910 from storage 908. Processing node 900 may further include other components such as a power management unit, a control interface unit, etc., which are omitted for clarity. Communication interface 902 permits processing node 900 to communicate with other network elements. User interface 904 permits the configuration and control of the operation of processing node 900.

Examples of processing node 900 include controller node 408 and gateway node 410. Processing node 900 can also be an adjunct or component of a network element, such as an element of access nodes 106 or 406 and the like. Processing node 900 can also be another network element in a communication system. Further, the functionality of processing node 900 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for configuring device to device communication, the method comprising:
   receiving, at an access node, device to device communication information identifying at least two wireless devices comprising a device to device communication group;
   transmitting data to a plurality of wireless devices proximate to the communication group, wherein the plurality of wireless devices are not part of the communication group;
   receiving NACK messages from the plurality of wireless devices proximate to the communication group corresponding to the transmitted data; and
   retransmitting data to the plurality of wireless devices proximate to the communication group based on the received NACK messages, wherein the at least two wireless devices comprising the communication group perform device to device communication during a transmission time interval for the retransmission.

2. The method of claim 1, further comprising:
   instructing the plurality of wireless devices proximate to the communication group to transmit a NACK message to the access node when the plurality of wireless devices successfully receive data.

3. The method of claim 2, further comprising:
determining a location for the communication group;
identifying a plurality of wireless devices within a threshold distance from the determined location for the communication group as proximate to the communication group;
instructing the plurality of wireless devices proximate to the communication group to transmit a NACK message to the access node when the plurality of wireless devices successfully receive a packet.

4. The method of claim 1, wherein the transmission time interval is reserved for downlink transmissions from the access node to wireless devices.

5. The method of claim 1, further comprising:
determining the transmission time interval for the retransmission; and
transmitting the determined transmission time interval to the communication group such that the determined transmission time interval is implicitly assigned for device to device communication for the communication group.

6. The method of claim 1, further comprising:
instructing the plurality of wireless devices proximate to the communication group to transmit an ACK message to the access node in association with the retransmission when the retransmitted data is unsuccessfully received.

7. A method for configuring device to device communication, the method comprising:
receiving, at an access node, device to device communication information identifying at least two wireless devices comprising a device to device communication group;
receiving data from a plurality of wireless devices proximate to the communication group, wherein the plurality of wireless devices are not part of the communication group;
transmitting NACK messages to the plurality of wireless devices proximate to the communication group corresponding to the received data; and
receiving retransmitted data from the plurality of wireless devices proximate to the communication group based on the transmitted NACK messages, wherein the at least two wireless devices comprising the communication group perform device to device communication during a transmission time interval for the retransmission.

8. The method of claim 7, further comprising:
transmitting the NACK messages to the plurality of wireless devices proximate to the communication group when data is successfully received from the wireless devices.

9. The method of claim 8, further comprising:
determining a location for the communication group;
identifying a plurality of wireless devices within a threshold distance from the determined location for the communication group as proximate to the communication group;
transmitting the NACK messages to the plurality of wireless devices proximate to the communication group when data is successfully received from the wireless devices.

10. The method of claim 7, wherein the transmission time interval is reserved for uplink transmissions from the plurality of wireless devices to the access node.

11. The method of claim 7, further comprising:
determining the transmission time interval for the retransmission; and
performing device to device communication by transmitting data, by at least one wireless device of the communication group, during the determined transmission time interval.

12. The method of claim 7, further comprising:
transmitting ACK messages in association with the retransmission to the plurality of wireless devices proximate to the communication group when the retransmitted data is unsuccessfully received.

13. A system for configuring device to device communication, the system comprising:
an access node with a processor configured to:
receive, at the access node, device to device communication information identifying at least two wireless devices comprising a device to device communication group;
transmitting data to a plurality of wireless devices proximate to the communication group, wherein the plurality of wireless devices are not part of the communication group;
receive NACK messages from the plurality of wireless devices proximate to the communication group corresponding to the transmitted data; and
retransmit data to the plurality of wireless devices proximate to the communication group based on the received NACK messages, wherein the at least two wireless devices comprising the communication group perform device to device communication during a transmission time interval for the retransmission.

14. The system of claim 13, where the access node is further configured to:
instruct the plurality of wireless devices proximate to the communication group to transmit a NACK message to the access node when the plurality of wireless devices successfully receive data.

15. The system of claim 14, where the access node is further configured to:
determine a location for the communication group;
identify a plurality of wireless devices within a threshold distance from the determined location for the communication group as proximate to the communication group;
instruct the plurality of wireless devices proximate to the communication group to transmit a NACK message to the access node when the plurality of wireless devices successfully receive a packet.

16. The system of claim 13, wherein the transmission time interval is reserved for downlink transmissions from the access node to wireless devices.

17. The system of claim 13, where the access node is further configured to:
determine the transmission time interval for the retransmission; and
transmit the determined transmission time interval to the communication group such that the determined transmission time interval is implicitly assigned for device to device communication for the communication group.

* * * * *